June 22, 1926.
E. A. BEARSON
1,589,674
WELDING ROD HOLDER
Filed April 20, 1925
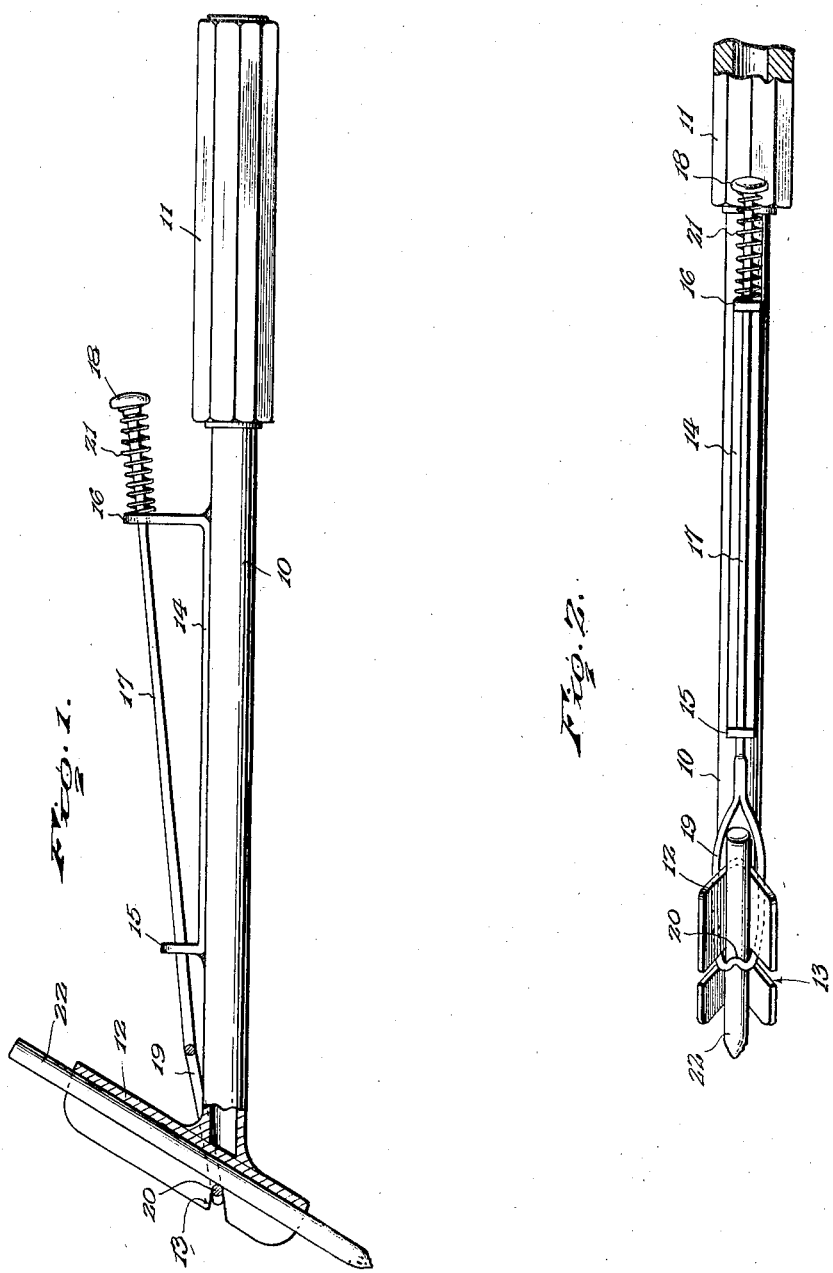
Inventor
E. A. Bearson.
By Lacey & Lacey, Attorney Patented June 22, 1926.

1,589,674

UNITED STATES PATENT OFFICE.

EDWIN A. BEARSON, OF FERTILE, MINNESOTA.

WELDING-ROD HOLDER.

Application filed April 20, 1925. Serial No. 24,618.

This invention relates to an improved welding rod holder particularly designed for use in acetylene welding and seeks, among other objects, to provide a holder wherein practically all of the welding rod may be used, thereby reducing waste of the rod to a minimum.

The invention seeks, as a further object, to provide a holder wherein the hands of the operator will be removed from the flame and heat, and of such construction that the welding rod may, while fusing, be more easily held in proper position than heretofore.

Another object of the invention is to provide a holder wherein the welding rod may be easily inserted or removed, wherein said rod will be firmly gripped and rigidly held upon the holder, and wherein the gripping means for the rod may be operated at the handle of the device.

And the invention seeks, as a still further object, to provide a holder wherein any ordinary welding rod as now in use, may be employed in conjunction with the device.

Other and incidental objects will appear hereinafter.

In the accompanying drawings:

Figure 1 is a side elevation of my improved welding rod holder, parts being broken away and illustrated in section.

Figure 2 is a top plan view of the holder, a portion of the handle being broken away.

In carrying the invention into effect, I employ a tubular stock 10 to the rear end of which is suitably fixed a handle 11, and welded or otherwise secured to the forward end of said stock is a substantially V-shaped saddle 12 inclined, as shown, with respect to the longitudinal axis of the stock. As brought out in Figure 2, the upper end of the saddle extends a considerable distance above the stock while the lower end of said saddle projects but a relatively short distance below the stock, and formed in the side flanges of said saddle are slots 13.

Welded or otherwise fixed to the stock 10 at its upper side is a guide plate 14 bent up at its forward end to form a short guide lug 15 and similarly bent up at its rear end to form a longer guide lug 16. Slidable through said lugs is a forwardly and downwardly inclined gripping member 17 extending over the inner end of the handle 11. Fixed to the rear end of said member is a knob 18 and formed on said member at its forward end is an angularly disposed gripping loop 19 straddling the saddle 12 and slidably received in the slots 13 thereof. As best shown in Figure 2, the bight of said loop, at the forward end thereof, is bowed rearwardly to form a gripping lug 20 which is freely received between the side flanges of the saddle to fit in the crotch between said flanges, and bearing between the lug 16 of the plate 14 and the knob 18 of the gripping member is a spring 21 normally holding said member retracted.

As will now be seen in view of the foregoing, by gripping the handle 11 and pushing forwardly on the knob 18, a welding rod, as conventionally illustrated at 22, may be readily disposed in the saddle 12 when, upon the release of the knob, the member 17 will be pressed rearwardly by the spring 21 so that the rod will be firmly gripped by the lug 20 of the gripping member and thus rigidly and firmly held within the saddle. Accordingly, the holder may be freely manipulated for directing the welding rod, incident to a welding operation, while the rod may be fed downwardly simply by momentarily pressing forwardly on the knob 18 and thus relieving the pressure of the lug 20 on said rod. Furthermore, since the saddle 12 extends but a short distance below the stock 10 while the loop 19 of the gripping member is formed to engage the welding rod opposite the forward end of the stock, all of the rod may be used except a short length thereof to extend between said loop and the lower end of the saddle.

Having thus described the invention, what I claim is:

1. A welding rod holder comprising a stock having a handle at one end, and an inclined V-shaped saddle at the opposite end arranged with the open side facing outwardly, and having inwardly disposed slots in its sides, and a spring-actuated member mounted on the stock and having a loop at its forward end embracing the said saddle and operating in the slots formed in the sides thereof, the outer end of the loop being bowed or crimped rearwardly to form a gripping lug.

2. A welding rod holder comprising a stock having a handle at one end and a V-shaped saddle at the opposite end projecting to unequal distances from and inclined to the axis of the stock, and having inwardly disposed slots in its sides, a plate mounted on a side of the stock and having its ends offset to form a short front lug and a rear long lug, a rod slidably mounted in the lugs and having an angularly disposed elongated loop at its front end embracing the saddle and operating in the slots thereof, and having its front end rearwardly bowed to form a gripping lug, and a spring on the rod normally urging it rearwardly.

In testimony whereof I affix my signature.

EDWIN A. BEARSON. [L. S.]